United States Patent

[11] 3,621,930

| [72] | Inventor | David D. Dutchak<br>2332 West Addison St., Chicago, Ill. 60618 |
|---|---|---|
| [21] | Appl. No. | 868,472 |
| [22] | Filed | Oct. 22, 1969 |
| [45] | Patented | Nov. 23, 1971 |

[54] SYSTEM OF ELECTRICITY GENERATION FOR MOTOR-DRIVEN VEHICLES
1 Claim, 3 Drawing Figs.

[52] U.S. Cl. ................................................ 180/65 R, 290/55
[51] Int. Cl. ................................................ B60l 11/18
[50] Field of Search .................................... 180/65, 60; 290/55, 44, 54, 43

[56] References Cited
UNITED STATES PATENTS

| 2,941,613 | 6/1960 | DiPerna | 180/65 R |
| 3,444,946 | 5/1969 | Waterbury | 180/65 R |
| 3,374,849 | 3/1968 | Redman | 180/65 R |

FOREIGN PATENTS

| 877,563 | 9/1942 | France | 180/1 |
| 887,902 | 8/1943 | France | 180/54 |

Primary Examiner—Benjamin Hersh
Assistant Examiner—Milton L. Smith
Attorney—Petherbridge, O'Neill & Lindgren ABSTRACT: A system of electricity generation for electric motor-driven vehicles consisting of a wind tunnel mounted on an equipped vehicle having open forward and rearward air intake and discharge ends, respectively, the forward open end being flared outwardly constituting an airscoop; plus a Venturi within the air tunnel communicating with the airscoop, and a battery of wind-activated electrically interconnected generators mounted within the tunnel in line communication with its open forward and rearward air intake and discharge ends.

PATENTED NOV 23 1971 3,621,930
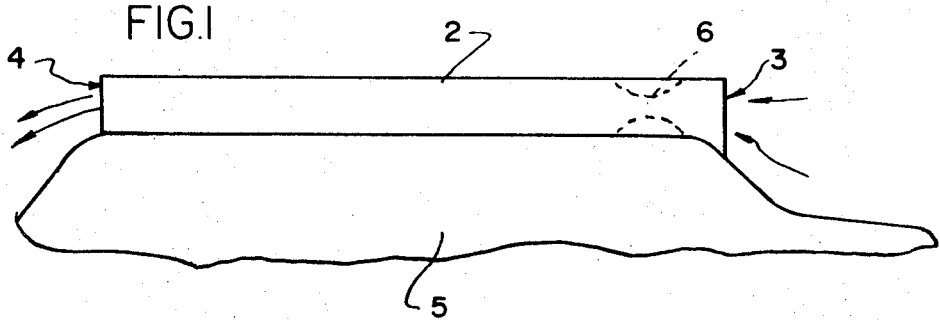
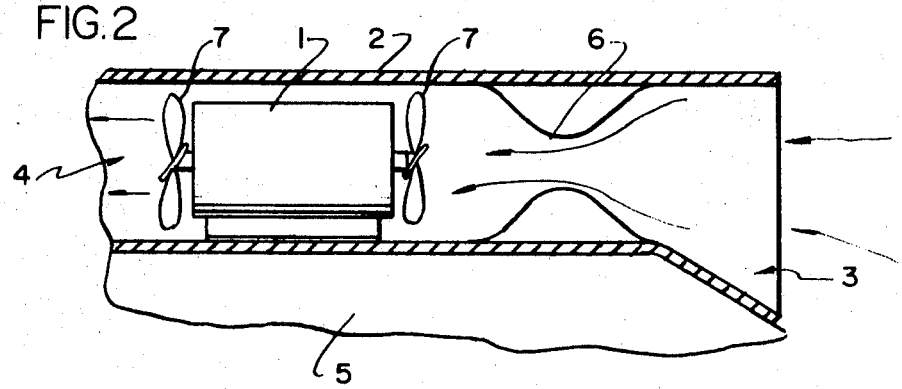
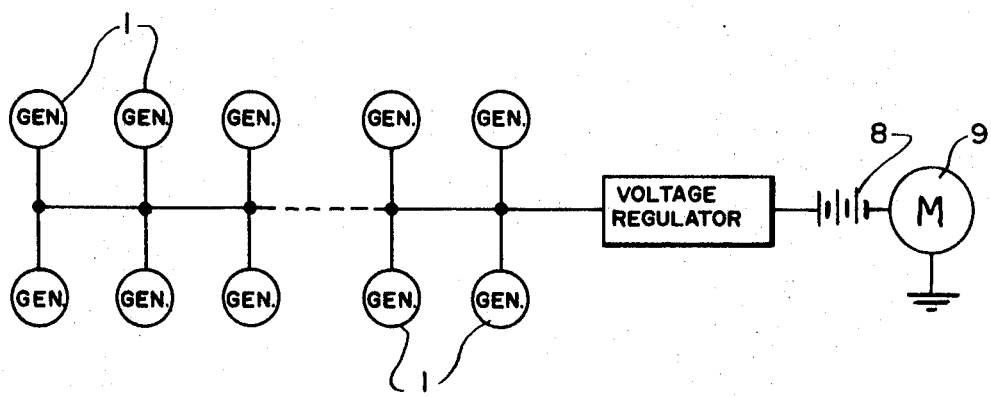
INVENTOR.
DAVID D. DUTCHAK
BY Pethebridge, O'Neill & Lindgren
ATTORNEYS.

SYSTEM OF ELECTRICITY GENERATION FOR MOTOR-DRIVEN VEHICLES

This invention relates to a system of electricity generation, its battery storage and use for the energization and controlled operation of an electric motor driven vehicle, it being the principal object thereof to provide a multiplicity of airflow-operated electric generators so arranged, mounted and housed on an equipped vehicle that with its forward movement a pressure flow of air will be coursed by and over the generator propellers, collectively operating them and charging the vehicle-provided storage battery, the amount of air thrust and drive applied to the generator propellers depending on the mass of air taken into the generator housing (air tunnel) and the extent to which it is flow accelerated and ejected therefrom, producing a ram air pressure.

FIELD AND SUMMARY OF THE INVENTION

In the field of motor vehicle manufacture the development and production of economical and dependable powerplants and fuels therefor are desirable. To such end accomplishment different characters and kinds of power sources and fuels have been developed and employed, though insofar as I am aware, the majority thereof have been either costly, expendable or consumable, entailing the costs of continuing production. In contradistinction to such, it is the purpose of my invention to provide and utilize a natural source of perpetually available and economical motive power, to wit, airflow course and treated in such coursing flow to create ram pressure which is applied to and operates or activates the propellers of ganged electric generators suitably mounted and housed within a vehicle carried and exposed air tunnel. With forward movement of the thus-equipped vehicle, air is gathered and entered into the forwardly disposed air tunnel scoop, converted to ram pressure and flow-contacted with the propellers of the generator battery thereby driving them and generating electric current which, in turn, is conducted to, charges and maintains a vehicle-carried storage battery at the desired or required voltage for operating the vehicle electric motor.

BRIEF DESCRIPTION OF DRAWINGS

FIG. 1 is a side elevation of the wind tunnel of the invention mounted on the roof of a motor-driven vehicle body, the latter being fragmentally shown, FIG. 2 is an enlarged fragmentary detail in vertical longitudinal section of the forward portion of the wind tunnel and airscoop showing one of the electric generators housed therein, and, FIG. 3 is a diagrammatic view of the system including the generators, storage battery, voltage regulator and electric motor in operative relation.

DESCRIPTION OF THE PREFERRED EMBODIMENT

With detailed reference to drawings, generally, the invention comprises a plurality or battery of electricity generators 1 fixedly mounted within a wind tunnel 2 the normally forward end of which is open and preferably outwardly flared in the fashion of an airscoop, as indicated by the reference number 3, and the normally rearward end is open, as at 4. The shape and size of the air tunnel may correspond, or substantially correspond to the top or roof of a so-called hardtop automobile body 5, and is appropriately secured thereto and positioned so that its open forward airscoop end 3 is substantially parallel to and adjacent the forward end of the vehicle body. Its rearward open end is parallel to and adjacent the vehicle rearward end. Both open ends are, of course, unobstructed, assuring a straight and free airway throughout the length of the tunnel.

To increase the rate of flow of air through the tunnel 1 following its entry thereinto via the scoop 3 and to materially increase its pressure (ram air pressure) the inner sides of the lip portions of the scoop are formed or otherwise provided with a venturi 6, though it may be differently located therein, as conditions or preference may dictate so long as it is outwardly of the generators 1.

Each generator 1 has a propeller 7 mounted on its armature shaft end and is adapted to be wind driven or rotated as and when the equipped vehicle is driven or moved forwardly. Thereby, the generation of electricity will be effected. If desired or required, the ends of the generator armature shafts may be extended and each fixedly mount a propeller 7 thereon.

The generators 1 are preferably connected in parallel to a storage battery 8 of required voltage suitably mounted on the equipped vehicle whereby to effect and maintain it at proper charge; a suitable type of voltage regulator being interposed in the connection for obvious purpose.

In operation, assuming that the battery 8 is at proper charge and connected to an appropriate conventional type of electric motor, symbol indicated by the number 9, geared to the drive wheels of the equipped vehicle, with energization of said motor drive, either forward or reverse, will be transmitted to the wheels at the desired speed.

With forward movement of the vehicle, intaking of air into and through the tunnel via the scoop 3 and venturi 6 will be effected, contacting and operating the generators whereby to replenish and/or maintain adequate voltage in the storage battery 8 for continuing operation of the vehicle-driving motor.

While I have hereinbefore described the invention for use in generating an electric power source for propelling motor driven vehicles it will, of course, be understood that its use is not so limited; that it may be employed for various other purposes usual in and for the operation of motor-driven vehicles.

I claim:

1. An apparatus for generating electrical energy for use in a vehicle comprising a passage means adapted to be mounted on the exterior of the roof of a vehicle with the longitudinal axis of the passage means being substantially parallel to the longitudinal axis of the vehicle, said passage means including a forward end portion creating an airscoop inlet opening, an open rear end portion for exhausting airflow and midportion creating a cylindrical flow passage interconnecting the forward end portion and the rear end portion, said forward end portion being in substantial axial alignment with the midportion and including a front inlet end having a greater cross-sectional area than the cylindrical flow passage whereupon movement of the vehicle induces air to be introduced into the front inlet, a plurality of air-operable electric generators being electrically interconnected and mounted within the cylindrical flow passage of said midportion of the passage means for supplying electrical energy to the vehicle, each of said electric generators including a pair of propeller members respectively mounted on opposite sides thereof for driving the generator in response to airflow through said passage means, and a venturi positioned within the midportion of the flow passage at a location immediately downstream of the airscoop inlet opening and upstream of the electric generator to increase the velocity of the air passing the generator.

* * * * *